United States Patent
Nguyen et al.

(10) Patent No.: US 7,104,325 B2
(45) Date of Patent: Sep. 12, 2006

(54) METHODS OF CONSOLIDATING SUBTERRANEAN ZONES AND COMPOSITIONS THEREFOR

(75) Inventors: Philip D. Nguyen, Duncan, OK (US); Johnny A. Barton, Marlow, OK (US)

(73) Assignee: Halliburton Energy Services, Inc., Duncan, OH (US)

( * ) Notice: Subject to any disclaimer, the term of this patent is extended or adjusted under 35 U.S.C. 154(b) by 297 days.

(21) Appl. No.: 10/616,052

(22) Filed: Jul. 9, 2003

(65) Prior Publication Data

US 2005/0006096 A1 Jan. 13, 2005

(51) Int. Cl.
*E21B 33/138* (2006.01)

(52) U.S. Cl. .................................. 166/295; 166/308.1
(58) Field of Classification Search ................ 166/292, 166/294, 295, 308.1, 280.1
See application file for complete search history.

(56) References Cited

U.S. PATENT DOCUMENTS

| | | | |
|---|---|---|---|
| 36,466 A | 9/1862 | Howe | |
| 3,404,735 A * | 10/1968 | Young et al. | 166/295 |
| 3,681,287 A * | 8/1972 | Brown et al. | 528/249 |
| 4,127,173 A | 11/1978 | Watkins et al. | 166/276 |
| 4,476,931 A * | 10/1984 | Boles et al. | 166/294 |
| 4,694,905 A | 9/1987 | Armbruster | 166/280 |
| 4,785,884 A | 11/1988 | Armbruster | 166/280 |
| 5,330,005 A | 7/1994 | Card et al. | 166/280 |
| 5,439,055 A | 8/1995 | Card et al. | 166/280 |
| 5,522,460 A * | 6/1996 | Shu | 166/295 |
| 5,551,514 A | 9/1996 | Nelson et al. | 166/280 |
| 5,604,184 A | 2/1997 | Ellis et al. | 507/117 |
| 5,806,593 A | 9/1998 | Surles | 166/270 |
| 5,840,784 A | 11/1998 | Funkhouser et al. | 523/130 |
| 5,960,877 A | 10/1999 | Funkhouser et al. | 166/270 |
| 6,177,484 B1 | 1/2001 | Surles | 523/131 |
| 6,187,839 B1 | 2/2001 | Eoff et al. | 523/130 |
| 6,668,926 B1 * | 12/2003 | Nguyen et al. | 166/281 |
| 6,705,400 B1 * | 3/2004 | Nguyen et al. | 166/281 |
| 6,725,931 B1 * | 4/2004 | Nguyen et al. | 166/280.2 |
| 6,729,404 B1 * | 5/2004 | Nguyen et al. | 166/280.2 |
| 6,978,836 B1 | 12/2005 | Nguyen et al. | 166/295 |
| 2004/0154799 A1 * | 8/2004 | Powell et al. | 166/304 |
| 2005/0006095 A1 | 1/2005 | Justus et al. | 166/295 |

* cited by examiner

*Primary Examiner*—William Neuder
(74) *Attorney, Agent, or Firm*—Robert A. Kent; Baker Botts

(57) ABSTRACT

Methods of consolidating subterranean zones and hardenable resin compositions are provided. A hardenable resin composition of the invention basically comprises a furan liquid resin mixture comprising a 2-furanmethanol homopolymer and furfuryl alcohol, an organosilane coupling agent and an acid catalyst.

35 Claims, No Drawings

METHODS OF CONSOLIDATING SUBTERRANEAN ZONES AND COMPOSITIONS THEREFOR

BACKGROUND OF THE INVENTION

1. Field of the Invention

The present invention provides methods of consolidating subterranean zones and hardenable resin compositions therefor.

2. Description of the Prior Art

Hydrocarbon producing wells are often completed in unconsolidated formations containing loose and incompetent particulate solids which migrate with hydrocarbons or hydrocarbons and water produced by the wells. The presence of the particulate solids in the produced fluids is highly undesirable in that the solid particles abrade tublar goods, pumping equipment, valves and other producing equipment and reduce the fluid production capabilities of the producing zones in the wells. Incompetent subterranean formations include those which contain loose particulate solids that are readily entrained by produced fluids and those wherein the particulate solids making up the formations are bonded together with insufficient strength to withstand the forces produced by the production of fluids from the formations. A technique which is often used for minimizing particulate solid production from unconsolidated formations has been to produce fluids from the formations at low flow rates whereby the near well stabilities of particulate solid bridges and the like in the formations are preserved. However, the collapse of such particulate solid bridges often occurs as a result of unintentional high production rates and/or pressure cycling. Pressure cycling occurs from frequent shut-ins and start-ups of a well. The frequency of the pressure cycling is very critical to the longevity of the near well formation, especially during the depletion stage of the well when the pore pressure of the formation has already been significantly reduced.

Heretofore, unconsolidated formations have been treated by injecting hardenable resin compositions into the formation and then allowing the resin compositions to harden whereby the unconsolidated formations are consolidated. While such heretofore utilized consolidating techniques have been used successfully, in high temperature subterranean zones, i.e., subterranean zones having temperatures above about 200° F., the hardenable resins have been broken down by chemical attack and/or thermal degradation thereby again allowing particulate solids to migrate with produced fluids. Also, to ensure that particulate solids are not produced, costly gravel packs, sand screens and the like have been installed in subterranean producing formations. However, because gravel packs and sand screens filter out particulate solids from the produced fluids, the presence of the filtered particulate solids adds to the flow resistance thereby producing additional pressure draw down which causes portions of the unconsolidated formations to break down.

Thus, there are needs for improved methods and hardenable resin compositions for consolidating unconsolidated subterranean zones whereby particulate solids do not migrate with produced fluids.

SUMMARY OF THE INVENTION

The present invention provides improved methods and compositions for consolidating subterranean zones including those having high temperatures which meet the needs described above and overcome the deficiencies of the prior art.

A method of this invention for consolidating a subterranean zone comprises the following steps. A brine preflush containing a cationic surfactant is introduced into the subterranean zone around and adjacent to the well bore penetrating it. A hardenable resin composition is next introduced into the subterranean zone around and adjacent to the well bore. The hardenable resin composition comprises a furan liquid resin mixture, a solvent, an organosilane coupling agent and an acid catalyst. Thereafter, a brine overflush containing a cationic surfactant is introduced into the subterranean zone to displace the resin composition from the pore space in the subterranean zone, and the hardenable resin composition is allowed to harden whereby the subterranean zone around and adjacent to the well bore is consolidated into a permeable mass.

Another method of consolidating a subterranean zone includes the following steps. A brine preflush containing a cationic surfactant is introduced into the subterranean zone around and adjacent to the well bore penetrating the zone. A hardenable resin composition is next introduced into the subterranean zone around and adjacent to the well bore. The hardenable resin composition comprises a furan liquid resin mixture, a solvent, an organosilane coupling agent and an acid catalyst. A clean-up brine is next circulated in the well bore penetrating the subterranean zone to remove the hardenable resin composition from the well bore without significantly disturbing the hardenable resin composition in the subterranean zone. The hardenable resin composition is then allowed to harden whereby the subterranean zone around and adjacent to the well bore including in the pore spaces thereof is consolidated into a solid impermeable mass. Thereafter, the subterranean zone is fractured and particulate proppant material is placed in the fractures to provide flow channels through the solid impermeable mass.

The hardenable resin composition of this invention basically comprises a furan liquid resin mixture comprising a 2-furanmethanol homopolymer and furfuryl alcohol, a solvent, an organosilane coupling agent and an acid catalyst.

The objects, features and advantages of the present invention will be readily apparent to those skilled in the art upon a reading of the description of preferred embodiments which follows.

DESCRIPTION OF PREFERRED EMBODIMENTS

The present invention provides methods of consolidating unconsolidated subterranean zones penetrated by well bores and hardenable resin compositions that are useful therefor. A method of the invention for consolidating a subterranean zone penetrated by a well bore comprises the following steps. A brine preflush containing a cationic surfactant is introduced into the subterranean zone around and adjacent to the well bore to remove debris and fines from the pore spaces in the subterranean zone. A hardenable resin composition is next introduced into the subterranean zone around and adjacent to the well bore. The hardenable resin composition comprises a furan liquid resin mixture, a solvent, an organosilane coupling agent and an acid catalyst. Thereafter, a brine overflush containing a cationic surfactant is introduced into the subterranean zone to displace the resin composition from the pore spaces in the subterranean zone, and the hardenable resin composition is allowed to harden whereby the subterranean zone around and adjacent to the well bore is consolidated into a permeable mass.

The brine preflush and overflush utilized in accordance with this invention are preferably sodium chloride brines. The sodium chloride is generally present in the brines in an amount of about 15% by weight of the brines.

The cationic surfactant included in the brine preflush and overflush is selected from the group consisting of ethoxylated nonyl phenol phosphate ester, $C_{12}$ to $C_{22}$ alkyl phosphonate surfactants and mixtures of one or more cationic surfactants and one or more non-ionic surfactants. Of these, a $C_{12}$–$C_{22}$ alkyl phosphonate surfactant is preferred. The cationic surfactant in the brine preflush functions to improve the contact of the hardenable resin composition with surfaces in the subterranean zone. The cationic surfactant in the overflush functions to water-wet the surfaces in the pore spaces. The cationic surfactant utilized is present in the brine preflush and overflush in an amount in the range of from about 0.01% to about 3% by weight of the preflush and overflush.

The furan liquid resin mixture in the hardenable resin composition comprises a 2-furanmethanol homopolymer present in the mixture in an amount in the range of from about 55% to about 60% by weight thereof and furfuryl alcohol present in the mixture in an amount in the range of from about 40% to about 45% by weight thereof. The furan liquid mixture is present in the hardenable resin composition in an amount in the range of from about 20% to about 60% by weight thereof.

The solvents that can be utilized in the hardenable resin composition include, but are not limited to, hydrolyzable alkyl esters, glycol ethers and mixtures thereof. Examples of hydrolyzable esters are furfuryl acetate and $C_1$ to $C_8$ alkyl acetates such as butyl acetate. Examples of glycol ethers are 2-butoxy ethanol, diethylene glycol methyl ether, dithylene glycol dimethyl ether and dipropylene glycol methyl ether. Of these, furfuryl acetate is preferred. The solvent utilized is present in the hardenable resin composition in an amount in the range of from about 40% to about 80% by weight of the hardenable resin composition.

Examples of organosilane coupling agents that can be utilized in the hardenable resin composition include, but are not limited to, N-2-(aminoethyl)-3-aminopropyltrimethoxysilane, 3-glycidoxypropyltrimethoxysilane and n-beta-(aminoethyl)-gamma-aminopropyltrimethoxysilane. Of these, N-2-(aminoethyl)-3-aminopropyltrimethoxysilane is preferred. The organosilane coupling agent utilized is present in the hardenable resin composition in an amount in the range of from about 0.1% to about 2% by weight thereof.

The furan liquid resin mixture solvent and organosilane coupling agent of the hardenable resin composition can be preblended as a single component that has a long shelf life ranging from several months to a few years and that can be transported to the well site ready for use without additional preparation. The acid catalyst utilized is mixed with the furan liquid resin mixture and organosilane coupling agent component just prior to introducing the hardenable resin composition into the subterranean zone to be consolidated. Preferably, the acid catalyst is metered into the furan liquid resin and organosilane coupling agent mixture as the mixture is pumped into the well bore and the subterranean zone.

The acid catalyst utilized in the hardenable resin composition is preferably an oil soluble acid or a slightly water soluble acid. Examples of such acids include, but are not limited to, salicylic acid, ethylenediaminetriacetic acid, benzoic acid, oxalic acid, maleic acid, alkyl benzenesulfonic acids such as toluene sulfonic acid, dodecyl benzene sulfonic acid, and the salts of such acids. Of these, alkyl benzenesulfonic acid is preferred. The acid catalyst is included in the hardenable resin composition in an amount in the range of from about 0.01% to about 10% by weight thereof, preferably in an amount of about 4%.

The brine preflush described above is preferably introduced into the subterranean zone to be consolidated at a pressure below the fracture pressure of the zone and at a rate in the range of from about 0.1 to about 5 barrels per minute. A total volume of the brine preflush introduced into the subterranean zone is preferably at least about 20 gallons of the brine preflush per foot of the well bore interval in the subterranean zone being consolidated.

The brine overflush introduced into the subterranean zone after the hardenable resin composition has been introduced therein is at a pressure below the fracture pressure of the zone and a rate in the range of from about 0.1 to about 5 barrels per minute. The total volume of the brine overflush introduced into the subterranean zone is preferably a volume of about three times the volume of the brine preflush that was introduced into the zone.

As mentioned above, after the brine overflush has been introduced into the subterranean zone to remove hardenable resin composition from the pore spaces in the zone, the hardenable resin composition is allowed to harden whereby the subterranean zone around and adjacent to the well bore is formed into a consolidated permeable mass. The consolidated permeable mass around and adjacent to the well bore prevent loose and incompetent sands and fines from flowing into the well bore with produced fluids.

An alternate method of this invention for consolidating a subterranean zone penetrated by a well bore that can be utilized is comprised of the following steps. A brine preflush containing a cationic surfactant is introduced into the subterranean zone around and adjacent to the well bore. A hardenable resin composition is next introduced into the subterranean zone around and adjacent to the well bore. The hardenable resin composition is comprised of a furan liquid resin mixture, a solvent, an organosilane coupling agent and an acid catalyst. A clean-up brine is next circulated in the well bore penetrating the subterranean zone to remove hardenable resin composition therefrom without significantly disturbing the hardenable resin composition in the subterranean zone. The hardenable resin composition is then allowed to harden in the subterranean zone around and adjacent to the well bore including in the pore spaces thereof whereby the subterranean zone is consolidated into a solid impermeable mass. Thereafter, the subterranean zone is perforated and fractured and particulate proppant material is placed in the fractures to provide flow channels through the solid impermeable mass that prevent unconsolidated sands and fines from being carried into the well bore with produced fluids.

The procedures utilized in fracturing subterranean zones and placing particulate proppant material in the fractures to thereby form fluid conductive channels therein are well known to those skilled in the art. The particulate proppant material utilized can be coated with a hardenable resin composition whereby after being placed in the fractures, the particulate proppant material is formed into hard permeable packs which prevent unconsolidated sands and fines from flowing through the fractures with produced fluids.

The brine preflush and clean-up solutions utilized in accordance with the alternate method are formed of the same components in the same amounts as those in the first method described above. Also, the components and amounts of components in the hardenable resin composition are the same as those described above.

A preferred method of this invention for consolidating a subterranean zone penetrated by a well bore comprises the steps of: (a) introducing a brine preflush containing a cationic surfactant into the subterranean zone around and adjacent to the well bore; (b) introducing a hardenable resin composition into the subterranean zone around and adjacent to the well bore, the hardenable resin composition comprising a furan liquid resin mixture, a solvent, an organosilane coupling agent and an acid catalyst; (c) introducing a brine overflush containing a cationic surfactant into the subterranean zone to displace the resin composition from the pore spaces in the subterranean zone; and (d) allowing the hardenable resin composition to harden and form the subterranean zone around and adjacent to the well bore into a consolidated permeable mass.

Another method of the present invention for consolidating a subterranean zone penetrated by a well bore comprises the steps of: (a) introducing a brine preflush containing a cationic surfactant into the subterranean zone around and adjacent to the well bore; (b) introducing a hardenable resin composition into the subterranean zone around and adjacent to the well bore, the hardenable resin composition comprising a furan liquid resin mixture, an organosilane coupling agent and an acid catalyst; (c) circulating a clean-up brine in the well bore penetrating the subterranean zone to remove hardenable resin composition therefrom without significantly disturbing the hardenable resin composition in the subterranean zone; (d) allowing the hardenable resin composition to harden in the subterranean zone whereby the subterranean zone around and adjacent to the well bore including in the pore spaces thereof is consolidated into a solid impermeable mass; and then (e) fracturing the subterranean zone and placing particulate proppant material therein to provide flow channels through the solid impermeable mass.

A hardenable resin composition of this invention comprises: a furan liquid resin mixture comprising a 2-furanmethanol homopolymer and furfuryl alcohol; a solvent; an organosilane coupling agent; and an acid catalyst.

In order to further illustrate the methods of this invention, the following examples are given.

Example 1

Inside a brass cylinder flow cell which had an inside diameter of 1.38 inches, 185 grams of 70/170 mesh-sand were packed to a length of 4.63 inches. A 200 mL brine solution of 15% sodium chloride which contained an alkyl phosphonate cationic surfactant in a concentration of 0.25% by weight of the brine solution was pre-flushed through the sand pack under vacuum. Next, 35 mL of a resin mixture containing 40% of a furan liquid resin mixture, 48% of furfuryl acetate, 1% of N-2-(aminoethyl)-3-aminopropyltrimethoxy silane and 1% of an alkyl phosphonate cationic surfactant were flushed through the sand pack in a similar manner to that of the preflush. The packed sand was then overflushed with 200 mL of 15% sodium chloride brine containing an alkyl phosphonate cationic surfactant in a concentration of 0.25% by weight of the brine solution. The sand pack was allowed to be saturated with brine solution and the cylinder was then placed in an oven at 325° F. for a 20-hour cure without applying closure stress. After curing, the sand pack was removed from the cylinder and cores were tested for unconfined compressive strength. An average unconfined compressive strength of 4,745 psi was obtained.

Example 2

Inside the brass cylinder flow cell described above, 185 grams of 40/60-mesh Ottawa sand was packed to a length of 4.75 inches. A 150 mL brine solution of 15% sodium chloride which contained an alkyl phosphonate cationic surfactant at a concentration of 0.25% by weight of the brine solution was pre-flushed through the sand pack under vacuum. Next, 100 mL of a resin mixture containing 40% of a furan liquid resin mixture, 48% of furfuryl acetate, 1% of N-2-(aminoethyl)-3-aminopropyltrimethoxy silane and 1% of an alkyl phosphonate cationic surfactant was flushed through the sand pack in a similar manner as that of the preflush. The packed sand was then overflushed with 250 mL of 15% sodium chloride brine containing an alkyl phosphonate cationic surfactant in a concentration of 0.25% by weight of the brine solution. The sand pack was allowed to be saturated with brine solution and the cylinder was then placed in an oven at 325° F. for a 22-hour cure without applying closure stress. After curing, the sand pack was removed from the cylinder and cores were tested to measure unconfined compressive strengths. The average unconfined compressive strength was 4,630 psi.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of consolidating a subterranean zone penetrated by a well bore comprising the steps of:
   (a) introducing a brine preflush containing a $C_{12}$–$C_{22}$ alkyl phosphonate cationic surfactant into said subterranean zone around and adjacent to said well bore;
   (b) introducing a hardenable resin composition into said subterranean zone around and adjacent to said well bore, said hardenable resin composition comprising a furan liquid resin mixture, a solvent, an organosilane coupling agent and an acid catalyst wherein said furan liquid resin mixture is present in said hardenable resin composition in an amount in the range of from about 20% to about 60% by weigh thereof;
   (c) introducing a brine overflush containing a $C_{12}$–$C_{22}$ alkyl phosphonate cationic surfactant into said subterranean zone to displace the resin composition from the pore space in said subterranean zone; and
   (d) allowing said hardenable resin composition consolidated.

2. The method of claim 1 wherein said brine preflush and overflush are sodium chloride brines.

3. The method of claim 2 wherein said sodium chloride is present in said brine preflush and overflush in an amount of about 15% by weight of said brine preflush and overflush.

4. The method of claim 1 wherein said cationic surfactant is present in said brine preflush and overflush in an amount in the range of from about 0.01% to about 3% by weight of said brine preflush and said brine overflush.

5. The method of claim 1 wherein said furan liquid resin mixture comprises a 2-furanmethanol homopolymer present in said mixture in an amount in the range of from about 55% to about 60% by weight thereof and furfuryl alcohol present in said mixture in an amount in the range of from about 40% to about 45% by weight thereof.

6. The method of claim 1 wherein said solvent is selected from the group consisting of furfuryl acetate, $C_1$–$C_8$ alkyl acetates, 2-butoxy ethanol, diethylene glycol methyl ether, diethylene glycol dimethyl ether, and dipropylene glycol methyl ether.

7. The method of claim 1 wherein said solvent is furfuryl acetate.

8. The method of claim 1 wherein said solvent is present in said hardenable resin composition in an amount in the range of from about 40% to about 80% by weight thereof.

9. The method of claim 1 wherein said organosilane coupling agent is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

10. The method of claim 1 wherein said organosilane coupling agent is N-2-(aminoethyl)-3-aminopropyltrimethoxysilane.

11. The method of claim 1 wherein said organosilane coupling agent is present in said hardenable resin composition in an amount in the range of from about 0.1% to about 2% by weight thereof.

12. The method of claim 1 wherein said acid catalyst is selected from the group consisting of salicylic acid, ethylenediaminetriacetic acid, benzoic acid, oxalic acid, maleic acid, alkyl benzenesulfonic acids and salts thereof.

13. The method of claim 1 wherein said acid catalyst is an alkyl benzenesulfonic acid.

14. The method of claim 1 wherein said acid catalyst is present in said hardenable resin composition in an amount in the range of from about 0.01% to about 10% by weight thereof.

15. The method of claim 1 wherein said brine preflush is introduced into said subterranean zone at a pressure below the fracture pressure of said zone and a rate in the range of from about 0.1 to about 5 barrels per minute until a total volume of at least about 20 gallons of said brine per foot of said well bore interval in said subterranean zone has been introduced.

16. The method of claim 1 wherein said brine overflush is introduced into said subterranean zone at a pressure below the fracture pressure of said zone and at a rate in the range of from about 0.1 to about 5 barrels per minute until a total volume of about 3 times the volume of said preflush has been introduced.

17. The method of claim 1 wherein said cationic surfactant in said brine preflush and said brine overflush is selected from the ground consisting of ethoxylated nonyl phenol phosphate ester, $C_{12}$ to $C_{22}$ alkyl phosphonate surfactants, and mixtures of at least one cationic surfactant with at least one non-ionic surfactant.

18. The method of claim 1 wherein said cationic surfactant in said brine preflush and said brine overflush comprises a $C_{12}$-$C_{22}$ alkyl phosphonate surfactant.

19. A method of consolidating a subterranean zone penetrated by a well bore comprising the steps of:

(a) introducing a brine preflush containing a cationic surfactant into said subterranean zone around and adjacent to said well bore;

(b) introducing a hardenable resin composition into said subterranean zone around and adjacent to said well bore, said hardenable resin composition comprising a furan liquid resin mixture, a solvent, an organosilane coupling agent and an acid catalyst wherein said furan liquid resin mixture is present in said hardenable resin composition in an amount in the range of from about 20% to about 60% by weight thereof;

(c) circulating a clean-up brine containing a penetrating said subterranean zone to remove hardenable resin composition therefrom without significantly disturbing the hardenable resin composition in said subterranean zone;

(d) allowing said hardenable resin composition to consolidated mass; and then (e) fracturing said subterranean zone and placing particulate proppant material therein to provide flow channels through said solid impermeable mass.

20. The method of claim 19 wherein said brine preflush and said clean-up brine are sodium chloride brines.

21. The method of claim 20 wherein said sodium chloride is present in said brine preflush and said clean-up brine in an amount of about 15% by weight of said brine preflush and said clean-up brine.

22. The method of claim 19 wherein said cationic surfactant is present in said brine preflush and said clean-up brine in an amount in the range of from about 0.01% to about 3% by weight of said brine preflush and said clean-up brine.

23. The method of claim 19 wherein said furan liquid resin mixture comprises a 2-furanmethanol homopolymer present in said mixture in an amount in the range of from about 55% to about 60% by weight thereof and furfuryl alcohol present in said mixture in an amount in the range of from about 40% to about 45% by weight thereof.

24. The method of claim 19 wherein said solvent is selected from the group consisting of furfuryl acetate, $C_1$–$C_8$ alkyl acetates, 2-butoxy ethanol, diethylene glycol methyl ether, diethylene glycol dimethyl ether, and dipropylene glycol methyl ether.

25. The method of claim 19 wherein said solvent is furfuryl acetate.

26. The method of claim 19 wherein said solvent is present in said hardenable resin composition in an amount in the range of from about 40% to about 80% by weight thereof.

27. The method of claim 19 wherein said organosilane coupling agent is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

28. The method of claim 19 wherein said organosilane coupling agent is N-2-(aminoethyl)-3-aminopropyltrimethoxysilane.

29. The method of claim 19 wherein said organosilane coupling agent is present in said hardenable resin composition in an amount in the range of from about 0.1% to about 2% by weight thereof.

30. The method of claim 19 wherein said acid catalyst is selected from the group consisting of salicylic acid, ethylenediaminetriacetic acid, benzoic acid, oxalic acid, maleic acid, alkyl benzenesulfonic acids and salts thereof.

31. The method of claim 19 wherein said acid catalyst comprises an alkyl benzenesulfonic acid.

32. The method of claim 19 wherein said acid catalyst is present in said hardenable resin composition in an amount in the range of from about 0.01% to about 10% by weight thereof.

33. The method of claim 19 wherein said brine preflush is introduced into said subterranean zone at a pressure below the fracture pressure of said zone and a rate in the range of from about 0.01 to about 5 barrels per minute until a total volume of at least about 20 gallons of said brine per foot of said subterranean zone has been introduced.

34. The method of claim 19 wherein said cationic surfactant in said brine preflush and said clean-up brine is selected from the group consisting of ethoxylated nonyl phenol phosphate ester, $C_{12}$ to $C_{22}$ alky phosphonate surfactants, and mixtures of at least one cationic surfactant with at least one non- ionic surfactant.

35. The method of claim 19 wherein said cationic surfactant in said brine preflush and said clean-up brine comprises a $C_{12}$–$C_{22}$ alkyl phosphonate surfactant.

* * * * *